United States Patent
Gao et al.

(10) Patent No.: US 11,620,080 B2
(45) Date of Patent: Apr. 4, 2023

(54) DATA STORAGE METHOD, DEVICE AND COMPUTER PROGRAM PRODUCT

(71) Applicant: EMC IP Holding Company LLC, Hopkinton, MA (US)

(72) Inventors: Jian Gao, Beijing (CN); Yousheng Liu, Beijing (CN); Xinlei Xu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 104 days.

(21) Appl. No.: 16/994,903

(22) Filed: Aug. 17, 2020

(65) Prior Publication Data
US 2021/0334042 A1 Oct. 28, 2021

(30) Foreign Application Priority Data
Apr. 27, 2020 (CN) .......................... 202010345657.7

(51) Int. Cl.
*G06F 3/06* (2006.01)

(52) U.S. Cl.
CPC .......... *G06F 3/0659* (2013.01); *G06F 3/0616* (2013.01); *G06F 3/0631* (2013.01); *G06F 3/0644* (2013.01); *G06F 3/0653* (2013.01); *G06F 3/0689* (2013.01)

(58) Field of Classification Search
CPC .... G06F 3/0659; G06F 3/0616; G06F 3/0631; G06F 3/0644; G06F 3/0653; G06F 3/0689
See application file for complete search history.

(56) References Cited

U.S. PATENT DOCUMENTS

| | | | | |
|---|---|---|---|---|
| 6,073,209 A | * | 6/2000 | Bergsten | G06F 13/1657 711/148 |
| 7,797,789 B2 | * | 9/2010 | Nuhn | A01K 1/0128 15/340.1 |
| 9,477,675 B1 | * | 10/2016 | Patel | G06F 16/1734 |
| 10,126,988 B1 | * | 11/2018 | Han | G06F 3/0604 |
| 10,229,022 B1 | * | 3/2019 | Gao | G06F 3/0689 |
| 11,048,416 B2 | | 6/2021 | Liu et al. | |
| 11,099,955 B2 | | 8/2021 | Gao et al. | |
| 11,150,990 B2 | | 10/2021 | Ma et al. | |
| 11,341,010 B2 | | 5/2022 | Han et al. | |
| 2014/0304547 A1 | * | 10/2014 | Sugawara | G06F 11/1076 714/6.22 |
| 2018/0210799 A1 | * | 7/2018 | Gao | G06F 11/2094 |

* cited by examiner

*Primary Examiner* — Charles Rones
*Assistant Examiner* — Han V Doan
(74) *Attorney, Agent, or Firm* — BainwoodHuang

(57) ABSTRACT

A technique involves determining, in redundant array of independent disks (RAID) stripes, source slices for restriping, and allocating, from a reserved capacity for file system check (FSCK), destination slices for restriping. The technique further involves performing restriping for the RAID stripes by copying data in the source slices into the destination slices. Accordingly, using the reserved capacity for FSCK as the destination slices for restriping may mitigate the influence on an available capacity of a mapper during restriping, thereby improving the performance of a storage system.

16 Claims, 5 Drawing Sheets

DATA STORAGE METHOD, DEVICE AND COMPUTER PROGRAM PRODUCT

CROSS-REFERENCE TO RELATED APPLICATION

This application claims priority to Chinese Patent Application No. CN202010345657.7, on file at the China National Intellectual Property Administration (CNIPA), having a filing date of Apr. 27, 2020, and having "DATA STORAGE METHOD, DEVICE AND COMPUTER PROGRAM PRODUCT" as a title, the contents and teachings of which are herein incorporated by reference in their entirety.

TECHNICAL FIELD

Embodiments of the present disclosure generally relate to the field of computers, and more particularly, to a data storage method, a device, and a computer program product.

BACKGROUND

Redundant array of independent disks (RAID) is a data backup technology, which is capable of combining a plurality of independent physical disks in different ways to form a disk array so as to provide better storage performance and reliability than a single disk does. In order to recover data when a certain disk in the RAID fails, one parity check information block (e.g., RAID 5) or more parity check information blocks (e.g., RAID 6) are usually set in the RAID.

Usually, in one RAID, there may be a plurality of disks equal to or greater than the width of the RAID, where each disk is divided into a plurality of slices, and each slice may have a predetermined size (e.g., 4 GB). RAID usually stores data through stripes. For example, in RAID 5, five slices on five disks may be combined to form an RAID stripe. When a certain disk in the RAID fails, reconstruction may be performed by check information, so that the data can be recovered and will not be lost.

SUMMARY OF THE INVENTION

Embodiments of the present disclosure provide a data storage method, a device, and a computer program product.

In one aspect of the present disclosure, there is provided a data storage method. The method includes determining, in RAID stripes, source slices for restriping, and allocating, from a reserved capacity for file system check, destination slices for restriping. The method further includes performing restriping for the RAID stripes by copying data in the source slices into the destination slices.

In another aspect of the present disclosure, there is provided an electronic device. The device includes a processing unit and a memory, wherein the memory is coupled to the processing unit and stores instructions. The instructions, when executed by the processing unit, perform the following actions: determining, in RAID stripes, source slices for restriping; allocating, from a reserved capacity for file system check, destination slices for restriping; and performing restriping for the RAID stripes by copying data in the source slices into the destination slices.

In yet another aspect of the present disclosure, there is provided a computer program product. The computer program product is tangibly stored in a non-transitory computer-readable medium and contains computer-executable instructions. The computer-executable instructions, when executed, cause a computer to perform a method or process according to the embodiments of the present disclosure.

The summary part is provided to introduce a selection of concepts in a simplified manner and will be further described in the following detailed description. The summary part is neither intended to identify key features or main features of the present disclosure, nor intended to limit the scope of the embodiments of the present disclosure.

BRIEF DESCRIPTION OF THE DRAWINGS

The foregoing and other objectives, features, and advantages of the present disclosure will become more apparent from more detailed description of the example embodiments of the present disclosure in conjunction with the accompanying drawings. In the example embodiments of the present disclosure, like reference numerals usually represent like elements.

DETAILED DESCRIPTION

Figure 1:
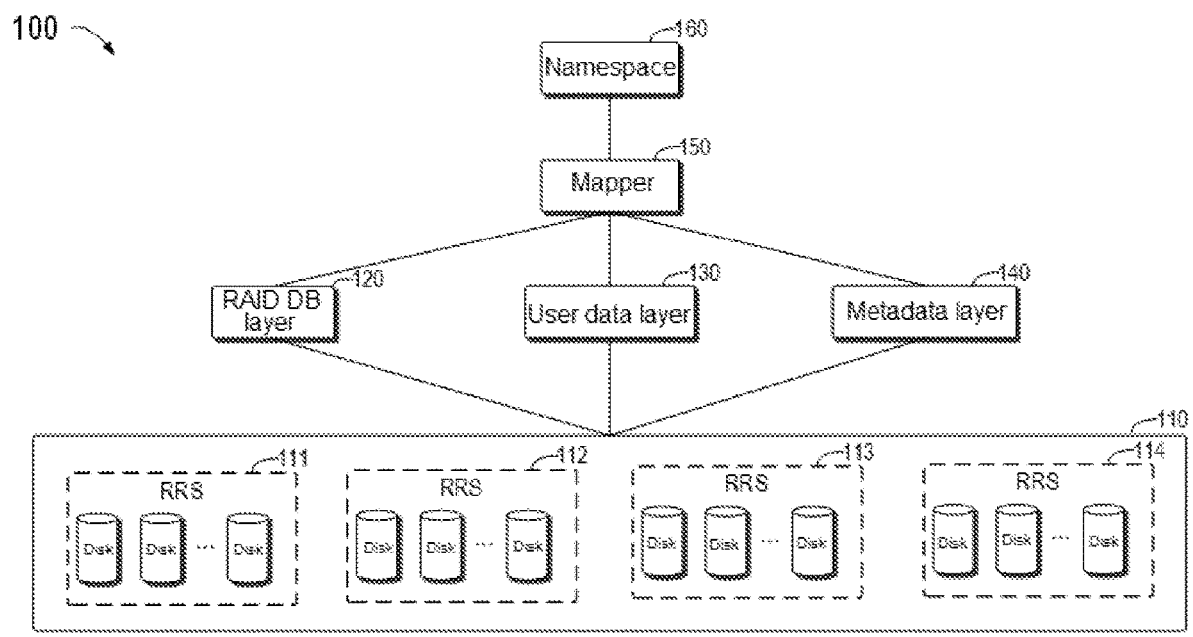
FIG. 1 shows a schematic diagram of an example environment of a storage system according to the embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although some specific embodiments of the present disclosure are shown in the accompanying drawings, it should be understood that the content of the present disclosure may be implemented in various forms, and should not be limited by the embodiments set forth herein. Instead, the embodiments are provided to make the present disclosure more thorough and complete and to fully convey the scope of the present disclosure to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects, unless specifically stated otherwise.

During restriping in a storage system, extra spaces usually need to be allocated for destination slices, but the destination slices allocated are not available externally in the restriping process, resulting in the decrease of storage capacity provided by the storage system, thus affecting the performance of the storage system.

To this end, embodiments of the present disclosure propose a new solution for allocating destination slices for restriping. According to the embodiments of the present disclosure, using a reserved capacity for file system check as the destination slices for restriping may mitigate the influence on an available capacity of a mapper during restriping, thereby improving the performance of the storage system. When a file system check operation is not performed, the reserved capacity for file system check is idle, and therefore, spaces may be borrowed from the reserved capacity to perform restriping.

It should be understood that although some embodiments of the present disclosure use RAID 5 as an example of a RAID included, any other types of RAIDs that are already known or to be developed in the future may be used in conjunction with the embodiments of the present disclosure. Basic principles and several example implementations of the present disclosure are illustrated below with reference to FIG. 1 to FIG. 7. It should be understood that these example embodiments are provided only to enable those skilled in the art to better understand and then implement the embodiments of the present disclosure, but not to limit the scope of the present disclosure in any way.

FIG. 1 shows a schematic diagram of example environment 100 of a storage system according to the embodiments of the present disclosure. As shown in example environment 100 of FIG. 1, storage pool 110 includes a plurality of RAID resilient sets (RRSs) 111, 112, 113, and 114, and each RRS constitutes a failure domain, which means that if a disk drive in a certain RRS fails, the reliability of other RRSs will not be affected. Storage pool 110 manages all disks in the storage system. In the embodiments of the present disclosure, each RRS may include a plurality of disks, e.g., any number between a threshold lower limit and a threshold upper limit.

Each disk may be divided into disk slices of predetermined sizes, for example, slices of 4 GB. A plurality of slices on different disks may constitute an RAID stripe, and a plurality of RAID stripes may constitute a mapper layer. For example, the RAID stripes may be allocated from storage pool 110, and if an RAID is of an RAID 5 type, five idle slices from five disks need to be allocated to create one RAID stripe so as to constitute one RAID 5 stripe. If the RAID is of an RAID 6 type, six idle slices from six disks need to be allocated to create one RAID stripe so as to constitute one RAID 6 stripe. In addition, it is required to ensure that all the slices included in each stripe need to be from the same RRS.

Storage pool 110 will expose some layers to the outside (e.g., user data layer 130, metadata layer 140, and the like) for use by other components, and each layer may include a plurality of stripes. Each layer applies a respective RAID policy based on its data type, and all the stripes in one layer apply the same RAID policy, for example, the same RAID width and the same RAID type. The layers may be extended as needed, so that new stripes may be dynamically allocated and allocated to the corresponding layers.

As shown in example environment 100, RAID database (DB) layer 120, user data layer 130, metadata layer 140, etc. may be constructed, wherein some of the layers are respectively mapped to namespace 160 by mapper 150 for use by an external host. Storage pool 110, RAID database layer 120, user data layer 130, metadata layer 140, mapper 150, etc. may constitute an RAID system. RAID DB layer 120 only includes a single stripe and is not exposed but only consumed by RAID content. User data layer 130 may employ RAID 5 and/or RAID 6, and the type and width of the RAID depend on the disk type and the number of disks in the system. For example, a 4+1, 8+1, or 16+1 RAID 5, a 4+2, 8+2, or 16+2 RAID 6, etc. may usually be supported. Generally speaking, a plurality of mirrors may be set for each layer, depending on the level of protection of specific data.

Mapper 150 is a core component in the RAID system, which regards each layer as a planar linear physical address space and exposes a single planar linear logical address space to namespace 160 additionally. For example, the logical address space may be quite large. In some embodiments, mapper 150 uses a B+ tree to maintain mapping between a logical address and a physical address in a 4K page size. Namespace 160 consumes and manages the linear logical space exposed by mapper 150, and namespace 160 will create a volume and expose the volume to the external host. Mapper 150 consumes an initiating layer (not shown), user data layer 130, and metadata layer 140. The initiating layer employs three mirrors, and mapper 150 stores on the initiating layer some important configurations that will be loaded on an initiating path. Metadata layer 140 may employ two mirrors, and metadata may be stored, for example, by B+ tree nodes. User data layer 130 employs RAID 5 and/or RAID 6, and all the host user data will be stored on user data layer 130.

Furthermore, although not shown, the storage system may also include a cache, a logger, a log data layer, a log metadata layer, and other modules and components; the cache provides a cache function in a memory and has two instances in the system: one instance is used for user data, and the other instance is used for metadata; and the cache provides a transaction operation function for mapper 150 so as to increase the access speed of data. When a transaction is submitted, if the transaction has modified some pages to prevent data loss, all modifications will be retained for certain special layers exposed by the RAID through a logging component. A log user data layer and a log metadata layer are created on certain special drives. The logging component consumes and manages spaces of the log user data layer and the log metadata layer, and the cache will use an API exposed by the logging component to load and retain dirty pages.

Figure 2:
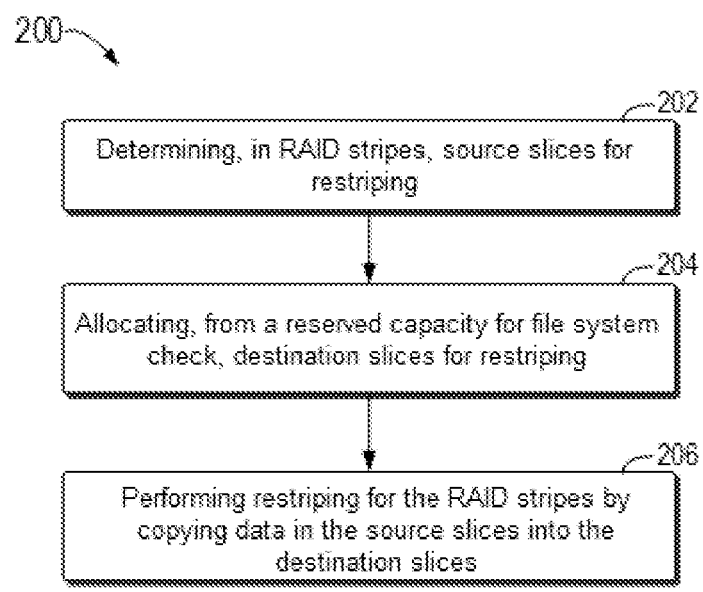
FIG. 2 shows a flowchart of a data storage method according to the embodiments of the present disclosure.

FIG. 2 shows a flowchart of data storage method 200 according to the embodiments of the present disclosure. At 202, source slices for restriping are determined in RAID stripes. For example, if one or more RAID stripes need to be restriped, one or more source slices where data is to be copied may be selected by a user or selected automatically. In some embodiments, whether to perform RRS splitting or RRS merging may be determined when a new disk is added into an RRS, and a restriping process of certain stripes is accordingly performed.

At 204, destination slices for restriping are allocated from a reserved capacity for file system check. File system check (FSCK) is used for detecting and repairing data failure in a file system, and the storage system usually has reserved a part of capacity (for example, 2.5% of a total capacity of the storage system is reserved) for file system check, wherein the reserved capacity is not available to the mapper. The file system check can scan all disks to find storage addresses of files, thereby achieving recovery of failed data. According to the embodiments of the present disclosure, in the restriping process of the RAID stripes, a part of capacity is borrowed from idle reserved capacity for file system check and is to be used as the destination slices for restriping. In this way, the influence of restriping on the available capacity of the storage system can be reduced.

At 206, restriping for the RAID stripes is performed by copying data in the source slices into the destination slices. For example, data is copied from the source slices selected from the stripes into the destination slices of the new disk, thereby completing restriping of the RAID stripes. Therefore, according to method 200 of the present disclosure, using the reserved capacity for file system check as the destination slices for restriping may mitigate the influence on an available capacity of the mapper during restriping, thereby improving the performance of the storage system.

In some embodiments, a plurality of RAID stripes may be simultaneously selected for restriping. For example, up to 64 RAID stripes may be selected at a time. If extra storage spaces are allocated to these stripes, a large extra space needs to be allocated to the destination slices, which will result in a great influence on the available capacity of the mapper during the entire restriping. Therefore, during parallel restriping of the plurality of RAID stripes, according to the embodiments of the present disclosure, the influence on the available capacity of the storage system can be more reduced by borrowing storage capacity from the reserved capacity for file system check.

In the storage system, the RRS needs to be reorganized after the storage pool is extended with the new disk by the user, and at the same time, the stripes in the RRS need to be reorganized so as to adapt to a new architecture for the purposes of performance and stability. There are two restriping types, i.e., restriping across the RRS and rearrangement within a single RRS, wherein restriping across the RRS can eliminate the problem that the stripes are across the RRS, and rearrangement can solve the problem of uneven distribution of data between all disks in a single RRS.

In some embodiments, when a new disk is added into the RRS, whether to split or merge is determined first, and if the number of disks in the RRS exceeds an upper limit after the new disk is added, the RRS needs to be split into two RRSs; otherwise, the new disk is merged into the RRS.

According to the embodiments of the present disclosure, restriping based on slice copy is triggered to eliminate the presence of the stripes across the RRS and/or enable data to be distributed between all the disks in the RRS more evenly, thereby achieving better IO performance of the storage system. Before restriping is performed, the destination slices for restriping need to be allocated to the stripes. Therefore, according to the embodiments of the present disclosure, the reserved capacity for file system check is borrowed as the destination slices for restriping, and when the data needs to be recovered through file system check, the restriping process may be terminated to release the destination slices. In this way, the destination slices for restriping will neither affect the capacity of the mapper nor affect the normal process of the file system check.

Figure 3:
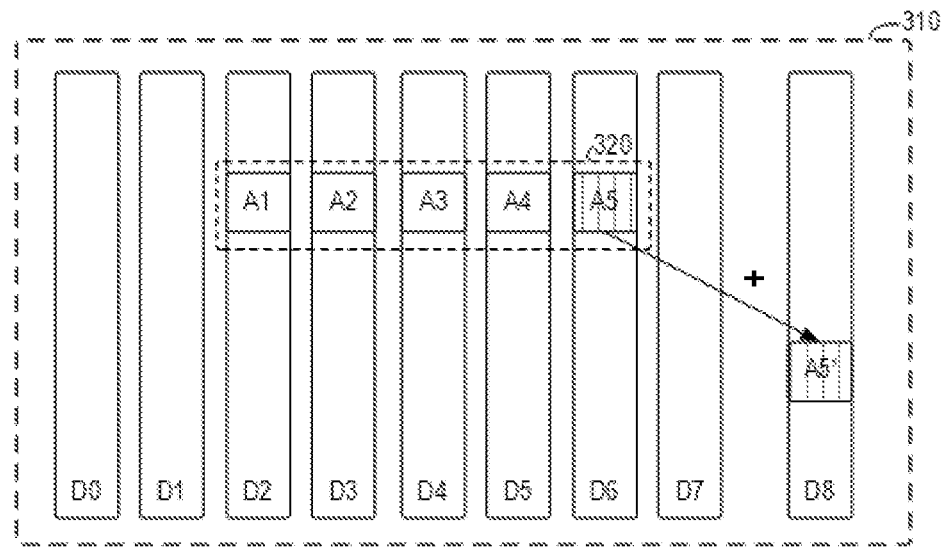
FIG. 3 shows a schematic diagram of a restriping process according to the embodiments of the present disclosure.

FIG. 3 shows a schematic diagram of restriping based on slice copy according to the embodiments of the present disclosure. As shown in FIG. 3, RRS 310 includes eight disks at the beginning, i.e., disks D0, D1, D2, D3, D4, D5, D6, D7, and D8, wherein one example stripe 320 is composed of slice A1 on disk D2, slice A2 on disk D3, slice A3 on disk D4, slice A4 on disk D5, and slice A5 on disk D6. As the capacity of the storage pool expands, disk D8 is newly added into RRS 310, while no data is stored in the newly added disk. In order to make the data to be more evenly distributed among all the disks in RRS 310, a restriping algorithm may be performed. For example, source slice A5 where data needs to be copied may be selected, and thus the data in source slice A5 in stripe 320 is to be copied into destination slice A5' in new disk D8. After the data is copied, slices A1, A2, A3, A4, and A5' constitute a new stripe, and the positions, e.g., geometric positions, of the slices in the stripe are updated. It should be understood that any restriping algorithm that is already known or to be developed in the future may be used in conjunction with the embodiments of the present disclosure, so as to perform a restriping operation in the storage system. According to the embodiments of the present disclosure, slice A5' may be a capacity reserved for file system consistency check, and in this way, the restriping process will not affect the available capacity of the storage system.

Figure 4:
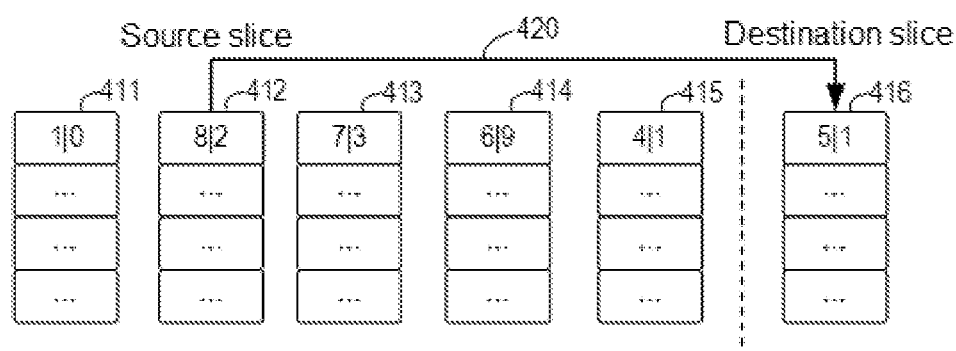
FIG. 4 shows a schematic diagram of recorded information of restriping according to the embodiments of the present disclosure.

FIG. 4 shows a schematic diagram of recorded information of restriping according to the embodiments of the present disclosure. FIG. 4 illustrates stripe information and data copy information of restriping. As shown in FIG. 4, five slices 411, 412, 413, 414, and 415 on five disks constitute one RAID stripe, and in the restriping process, data in source slice 412 representing the second slice of the eighth disk is copied into destination slice 416 representing the first slice of the fifth disk, as shown in 420. Thus, the stripe formed after restriping includes slices 411, 416, 413, 414, and 415. In addition, a generation code, a reconstruction bitmap, a copy sign, and other information of the data in the stripe may further be recorded.

Figure 5:
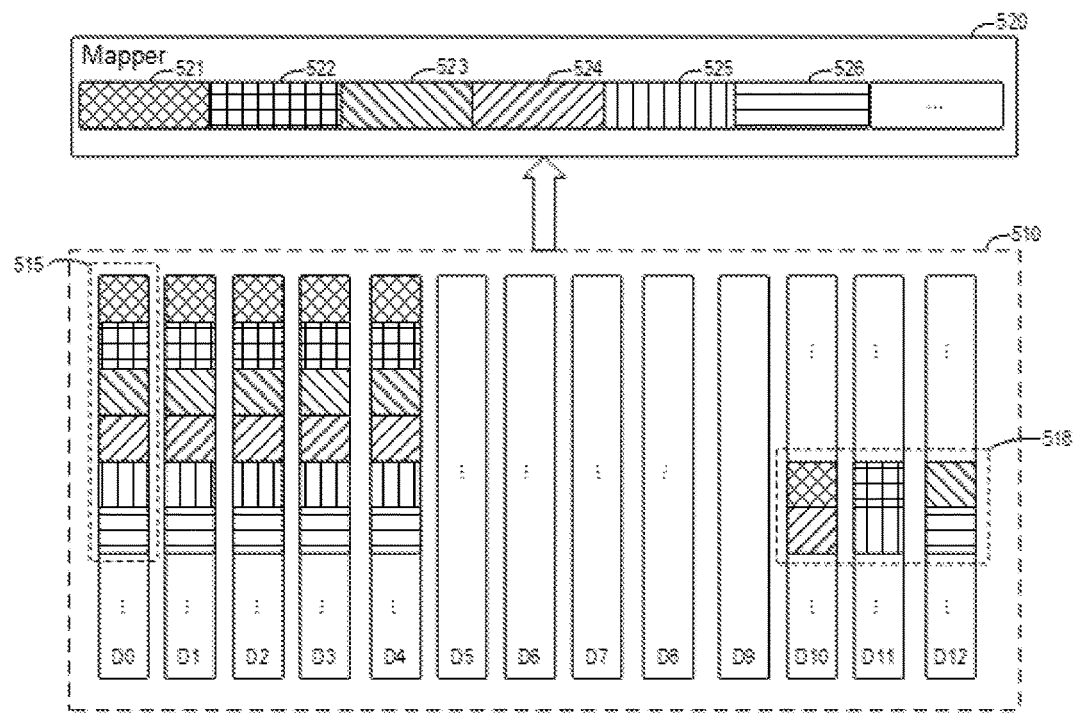
FIG. 5 shows a schematic diagram of a reserved space of restriping according to the embodiments of the present disclosure.

FIG. 5 shows a schematic diagram of a reserved space of restriping according to the embodiments of the present disclosure. As shown in FIG. 5, RRS 510 includes 13 disks, a plurality of RAID stripes are constructed in RRS 510 through the RAID, such as an RAID stripe composed of slices in disks D0-D4, and RRS 510 can output a storage service for mapper 520, for example, providing RAID stripes or a stripe set (also referred to as "uber"), such as stripes 521, 522, 523, 524, 525, and 526. In order to minimize the influence of the restriping operation on the available capacity of the mapper, it is necessary to avoid or reduce the influence of allocated destination slices on the available capacity output to the mapper so that the destination slices for restriping are transparent to the available capacity of the mapper.

FIG. 5 shows a process of restriping for the stripes on disk D0, where some source slices in the RAID stripes in disk D0 are selected, as shown in 515. Then, the data in the source slices may be copied into the allocated destination slices, like the positions of the destination slices shown in 518. During data copy, the destination slices at 518 may be marked as used, and the available capacity of mapper 520 of the storage system may be kept unchanged. According to the embodiments of the present disclosure, the destination slices at 518 are storage spaces borrowed from the reserved capacity for file system check. In this way, the restriping process will not affect the available capacity of the storage system.

Figure 6:
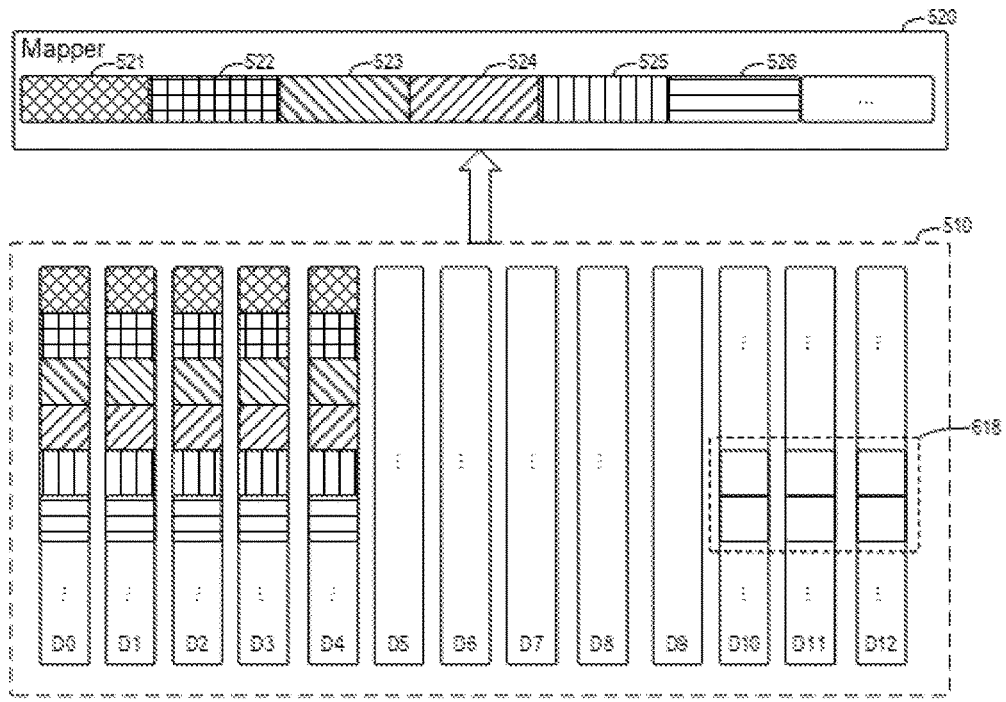
FIG. 6 shows a schematic diagram of termination of restriping according to the embodiments of the present disclosure.

FIG. 6 shows a schematic diagram of termination of restriping according to the embodiments of the present disclosure. As shown in FIG. 6, during execution of restriping, data failure (e.g., software failure) may occur in the storage system or a new disk may be added, and file system check for the storage system needs to be initiated for the purposes of data recovery and the like. Because the priority of the file system check is higher than that of restriping, execution of the current restriping needs to be terminated, and then the destination slices borrowed from the reserved capacity for file system check are released. As shown in 618, the reserved capacity is released in response to termination of restriping, in which the data is cleared, and the data copy operation is terminated. Next, the reserved capacity is used to perform the file system check for the storage system until the check is completed. In this way, the reserved capacity can be returned to the file system check service in time, so that not only the capacity of the mapper is not affected by the destination slices for restriping, but also the normal operation of the file system check is not affected.

In some embodiments, whether the file system check for the storage system is completed or not may be periodically determined, and the execution of the restriping is re-initiated after the file system check for the storage system is completed. Then, after the restriping is completed, the information of the RAID stripes is updated, such as the positions of the slices in all the RAID stripes. In this way, the restriping can be performed by borrowing the reserved capacity for file system check at the time when the file system check is not affected, thereby improving the resource utilization rate of reserved spaces. In addition, by ensuring the priority of the file system check, borrowing the reserved capacity by the restriping will not affect the normal operation of the file system check.

Figure 7:
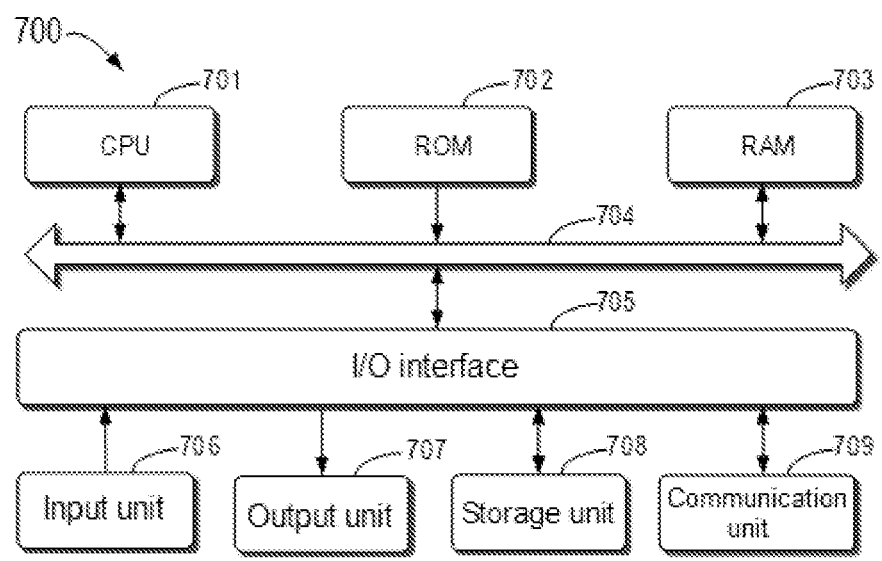
FIG. 7 shows a schematic block diagram of a device that may be used to implement the embodiments of the present disclosure.

FIG. 7 shows a schematic block diagram of electronic device 700 that may be used to implement the embodiments of the present disclosure. Device 700 may be the device or apparatus described in the embodiments of the present disclosure. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices over a computer network such as the Internet and/or various telecommunication networks.

The various methods or processes described above may be performed by processing unit 701. For example, in some embodiments, the method may be implemented as a computer software program that is tangibly contained in a machine-readable medium such as storage unit 708. In some embodiments, part or all of the computer program may be loaded and/or installed onto device 700 via ROM 702 and/or communication unit 709. When the computer program is loaded onto RAM 703 and executed by CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that can retain and store instructions for use by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanical encoding device such as a punch card or protrusions in a groove with instructions stored thereon, and any suitable combination of the foregoing. The computer-readable storage medium, as used herein, is not explained as transient signals themselves, such as radio waves or other freely propagating electromagnetic waves, electromagnetic waves propagating through a waveguide or other transmission media (for example, light pulses propagating through a fiber-optic cable), or electrical signals transmitted through an electrical wire.

The computer-readable program instructions described herein can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet provided by an Internet service provider). In some embodiments, an electronic circuit, for example, a programmable logic circuit, a field-programmable gate array (FPGA), or a programmable logic array (PLA), is customized by utilizing state information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or other programmable data processing apparatuses to produce a machine, such that, when these instructions are executed by the processing unit of the computer or other programmable data processing apparatuses, an apparatus for implementing the functions/actions specified in one or more blocks in the flowcharts and/or block diagrams is produced. These computer-readable program instructions may also be stored in the computer-readable storage medium, and these instructions cause a computer, a programmable data processing apparatus, and/or other devices to work in a specific manner. Therefore, the computer-readable medium having instructions stored thereon includes an article of manufacture that includes instructions for implementing various aspects of the functions/actions specified in one or more blocks of the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the device, the method, and the computer program product according to a plurality of embodiments of the present disclosure. In this regard, each block in the flowcharts or block diagrams may represent a module, a program segment, or part of instructions, which contains one or more executable instructions for implementing specified logical functions. In some alternative implementations, the functions noted in the blocks may also occur in an order different from that noted in the accompanying drawings. For example, two consecutive blocks may in fact be executed substantially concurrently, and sometimes they may also be executed in the reverse order, depending on the functions involved. It should also be noted that each block in the block diagrams and/or flowcharts and combinations of blocks in the block diagrams and/or flowcharts can be implemented with a dedicated hardware-based system that performs specified functions or actions, or with a combination of dedicated hardware and computer instructions.

Various embodiments of the present disclosure have been described above. The foregoing description is illustrative rather than exhaustive, and is not limited to the disclosed embodiments. Multiple modifications and variations will be apparent to those skilled in the art without departing from the scope and spirit of the illustrated various embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A data storage method, comprising:
   determining, in redundant array of independent disks (RAID) stripes, source slices for restriping;
   allocating, by borrowing from a reserved capacity located in a plurality of disks, wherein the reserved capacity is reserved for use by a file system check that detects and repairs data failures in a file system at least in part by scanning the plurality of disks for storage addresses of files, destination slices for restriping; performing restriping for the RAID stripes by copying data in the source slices into the destination slices;
   during execution of the restriping, marking the destination slices as used; and
   initiating the file system check by
      terminating the execution of the restriping,
      in response to termination of the execution of the restriping, releasing the destination slices that were borrowed from the reserved capacity and marked as used, and
      using the reserved capacity to perform the file system check for the storage system.

2. The method of claim 1, wherein the determining the source slices for restriping comprises:
   determining whether to split a RAID resilient set (RRS) based on a determination that a new disk is added into a storage pool; and
   receiving a selection of the source slices for restriping across the RRS based on a determination that the RRS is to be split.

3. The method of claim 2, wherein the determining the source slices for restriping further comprises:
   merging the new disk into the RRS to generate a new RRS based on a determination that the RRS does not need to be split; and
   receiving a selection of the source slices for restriping within the new RRS.

4. The method of claim 1, further comprising during execution of the restriping,
   keeping an available capacity of a mapper of a storage system unchanged.

5. The method of claim 4, further comprising:
   allocating, from a total capacity of the storage system, a capacity of a predetermined proportion as the reserved capacity for use by the file system consistency check, wherein the reserved capacity is unavailable to the mapper.

6. The method of claim 1, further comprising:
   wherein the initiating of the file system check for the storage system is performed in response to data failure during the execution of the restriping.

7. The method of claim 1, further comprising:
   determining whether the file system check for the storage system is completed;
   re-initiating the execution of the restriping based on a determination that the file system check for the storage system is completed; and
   updating information of the RAID stripes after the restriping is completed.

8. The method of claim 1, wherein the reserved capacity is unavailable to a mapper that maintains a mapping between physical addresses and logical addresses, and wherein the logical addresses are exposed by the mapper to a namespace that creates a volume and exposes the volume to an external host.

9. An electronic device, comprising:
- a processing unit; and
- a memory coupled to the processing unit and storing instructions, wherein the instructions, when executed by the processing unit, perform the following actions:
  - determining, in redundant array of independent disks (RAID) stripes, source slices for restriping;
  - allocating, by borrowing from a reserved capacity located in a plurality of disks, wherein the reserved capacity is reserved for use by a file system check that detects and repairs data failures in a file system at least in part by scanning the plurality of disks for storage addresses of files, destination slices for restriping;
  - performing restriping for the RAID stripes by copying data in the source slices into the destination slices;
  - during execution of the restriping, marking the destination slices as used; and
  - initiating the file system check by
    - terminating the execution of the restriping,
    - in response to termination of the execution of the restriping, releasing the destination slices that were borrowed from the reserved capacity and marked as used, and
    - using the reserved capacity to perform the file system check for the storage system.

10. The device of claim 9, wherein the determining the source slices for restriping comprises:
- determining whether to split a RAID resilient set (RRS) based on a determination that a new disk is added into a storage pool; and
- receiving a selection of the source slices for restriping across the RRS based on a determination that the RRS is to be split.

11. The device of claim 10, wherein the determining the source slices for restriping further comprises:
- merging the new disk into the RRS to generate a new RRS based on a determination that the RRS does not need to be split; and
- receiving a selection of the source slices for restriping within the new RRS.

12. The device of claim 9, further comprising during execution of the restriping,
keeping an available capacity of a mapper of a storage system unchanged.

13. The device of claim 12, wherein the actions further comprise:
- allocating, from a total capacity of the storage system, a capacity of a predetermined proportion as the reserved capacity that is reserved for use by the file system consistency check, wherein the reserved capacity is unavailable to the mapper.

14. The device of claim 9, wherein the actions further comprise:
- initiating the file system check for the storage system in response to data failure during the execution of the restriping.

15. The device of claim 9, wherein the actions further comprise:
- determining whether the file system check for the storage system is completed;
- re-initiating the execution of the restriping based on a determination that the file system check for the storage system is completed; and
- updating information of the RAID stripes after the restriping is completed.

16. A computer program product having a non-transitory computer readable medium which stores a set of instructions to perform data storage; the set of instructions, when carried out by computerized circuitry, causing the computerized circuitry to perform a method of:
- determining, in redundant array of independent disks (RAID) stripes, source slices for restriping;
- allocating, by borrowing from a reserved capacity located in a plurality of disks, wherein the reserved capacity is reserved for use by a file system check that detects and repairs data failures in a file system at least in part by scanning the plurality of disks for storage addresses of files, destination slices for restriping;
- performing restriping for the RAID stripes by copying data in the source slices into the destination slices;
- during execution of the restriping, marking the destination slices as used; and
- initiating the file system check by
  - terminating the execution of the restriping,
  - in response to termination of the execution of the restriping, releasing the destination slices that were borrowed from the reserved capacity and marked as used, and
  - using the reserved capacity to perform the file system check for the storage system.

* * * * *